US007706947B2

(12) United States Patent
Bozem et al.

(10) Patent No.: US 7,706,947 B2
(45) Date of Patent: Apr. 27, 2010

(54) INDUSTRIAL TRUCK HAVING INCREASED STATIC OR QUASI-STATIC TIPPING STABILITY

(75) Inventors: Gerhard Bozem, Heinrichsthal (DE); Andreas Carlitz, Stolberg (DE); Bernhard Götz, Aschaffenburg (DE); Jürgen Roth, Niedernberg (DE); Frank Schröder, Obernburg (DE)

(73) Assignee: Linde Material Handling GmbH, Aschaffenburg (DE)

( * ) Notice: Subject to any disclaimer, the term of this patent is extended or adjusted under 35 U.S.C. 154(b) by 111 days.

(21) Appl. No.: 11/099,992

(22) Filed: Apr. 6, 2005

(65) Prior Publication Data

US 2005/0281656 A1 Dec. 22, 2005

(30) Foreign Application Priority Data

Apr. 7, 2004 (DE) ....................... 10 2004 017 056

(51) Int. Cl.

| | |
|---|---|
| ***B66F 9/06*** | (2006.01) |
| ***B66F 9/16*** | (2006.01) |
| ***B66F 17/00*** | (2006.01) |
| ***B66C 13/16*** | (2006.01) |
| ***G01G 23/365*** | (2006.01) |

(52) U.S. Cl. ......................... 701/50; 414/631; 414/632; 414/636; 212/282; 212/283; 177/45; 177/46; 187/222; 187/223; 187/224; 187/393; 187/394; 340/438; 340/440; 180/117; 180/118; 701/36

(58) Field of Classification Search ................. 180/222, 180/223, 224, 226, 229, 233, 237; 701/50, 701/54

See application file for complete search history.

(56) References Cited

U.S. PATENT DOCUMENTS

| | | | | |
|---|---|---|---|---|
| 4,068,773 | A * | 1/1978 | Downing et al. | 414/636 |
| 4,168,934 | A * | 9/1979 | Downing et al. | 414/636 |
| 4,354,568 | A | 10/1982 | Griesenbrock | |
| 4,411,582 | A * | 10/1983 | Nakada | 414/636 |
| 4,511,974 | A * | 4/1985 | Nakane et al. | 701/124 |
| 4,520,443 | A * | 5/1985 | Yuki et al. | 701/50 |
| 4,634,332 | A * | 1/1987 | Kamide et al. | 414/273 |

(Continued)

FOREIGN PATENT DOCUMENTS

DE 29 09 667 9/1980

(Continued)

*Primary Examiner*—Jack W. Keith
*Assistant Examiner*—Jonathan M Dager
(74) *Attorney, Agent, or Firm*—The Webb Law Firm

(57) ABSTRACT

A forward-control counterweight fork-lift truck has a liftable and tiltable load-lifting device (1), a traction drive and operating drives for the movement of the load-lifting device (1). A calculation model (D) is stored in a control device (SE), to which directly or indirectly acting sensors (S) are connected for detecting the lifting load (L), the lifting height (H), the tilting angle (WM), the load torque (M), the direction of travel (R), the driving speed (V), and the steering angle (WL). The control device (SE) is designed to determine a driving and load state (Z) based on the detected physical variables (L, H, WM, M, R, V, WL) and the stored calculation model (D) and is operatively connected to the traction drive and the operating drives. Depending on the driving and load state (Z) determined, the operating speed, starting and braking acceleration, and driving speed are each reduced.

4 Claims, 2 Drawing Sheets

U.S. PATENT DOCUMENTS 4,828,066 A * 5/1989 Hayashi .................... 180/446
4,869,635 A * 9/1989 Krahn ...................... 414/274
4,942,529 A * 7/1990 Avitan et al. ................ 701/50
5,011,358 A * 4/1991 Andersen et al. ........... 414/273
5,088,879 A * 2/1992 Ranly ....................... 414/636
5,131,801 A * 7/1992 Melanson ................... 414/635
5,224,815 A * 7/1993 Abels et al. ................ 414/635
5,509,293 A * 4/1996 Karumanchi ................ 73/1.13
5,687,081 A * 11/1997 Wellman et al. ............. 701/50
5,730,305 A * 3/1998 Ichiba et al. ............... 212/276
5,738,187 A * 4/1998 Dammeyer et al. ......... 187/222
5,749,696 A * 5/1998 Johnson ..................... 414/635
5,906,648 A * 5/1999 Zoratti et al. ............... 701/50
5,929,388 A * 7/1999 Uehara et al. ............... 177/136
5,938,710 A * 8/1999 Lanza et al. ................. 701/50
5,947,516 A * 9/1999 Ishikawa ..................... 280/755
5,955,706 A * 9/1999 Fonkalsrud et al. ......... 177/136
5,995,001 A * 11/1999 Wellman et al. ............ 340/438
6,050,770 A * 4/2000 Avitan ........................ 414/636
6,056,501 A * 5/2000 Ishikawa et al. ............ 414/636
6,082,742 A * 7/2000 Ishikawa ................. 280/5.508
6,135,694 A 10/2000 Trego et al.
6,164,415 A * 12/2000 Takeuchi et al. ............ 187/224
6,185,489 B1 * 2/2001 Strickler ...................... 701/29
6,202,410 B1 * 3/2001 Nakashima .................. 60/433
6,209,913 B1 * 4/2001 Ishikawa et al. ............ 280/755
6,240,353 B1 * 5/2001 Ishikawa et al. ............. 701/50
RE37,215 E * 6/2001 Dammeyer et al. ......... 187/222
6,266,594 B1 * 7/2001 Ishikawa ..................... 701/50
6,350,100 B1 * 2/2002 Naruse et al. ............... 414/635
6,425,728 B1 * 7/2002 Goto .......................... 414/636
6,552,279 B1 * 4/2003 Lueschow et al. ........... 177/141
6,611,746 B1 * 8/2003 Nagai .......................... 701/50
6,719,098 B1 * 4/2004 Ishikawa et al. ............ 187/222
6,721,680 B2 * 4/2004 Sorrells et al. ............. 702/174
6,785,597 B1 * 8/2004 Farber et al. ................. 701/50
6,854,552 B2 * 2/2005 Yurushi ...................... 180/253
6,985,795 B2 * 1/2006 Scotese ...................... 700/217
7,014,054 B2 * 3/2006 Yahiaoui et al. ............ 212/277
7,026,557 B2 * 4/2006 Rice et al. ................... 177/136
7,138,925 B2 * 11/2006 Nield ......................... 340/685
7,216,024 B1 * 5/2007 Abels et al. ................... 701/50
2001/0056319 A1 * 12/2001 Rocke ......................... 701/50
2003/0111652 A1 * 6/2003 Hoffend, Jr. ................ 254/331
2003/0205418 A1 * 11/2003 Enmeiji et al. ................ 180/21
2004/0083025 A1 * 4/2004 Yamanouchi et al. ....... 700/213
2004/0098146 A1 * 5/2004 Katae et al. ................... 700/50
2004/0249538 A1 * 12/2004 Osaki et al. ................... 701/50
2005/0102081 A1 * 5/2005 Patterson ..................... 701/50

FOREIGN PATENT DOCUMENTS

EP 0 343 839 11/1989
EP 1 078 878 8/2001
EP 1 019 315 8/2002

* cited by examiner

INDUSTRIAL TRUCK HAVING INCREASED STATIC OR QUASI-STATIC TIPPING STABILITY

CROSS-REFERENCE TO RELATED APPLICATION

This application claims priority to German Application No. 10 2004 017 056.8 filed Apr. 7, 2004, which is herein incorporated by reference in its entirety.

BACKGROUND OF THE INVENTION

1. Field of the Invention

The invention relates to an industrial truck, in particular a forward-control counterweight fork-lift truck, having a liftable and tiltable load-lifting device, a traction drive, and operating drives for movement of the load-lifting device.

2. Technical Considerations

In the case of conventional industrial trucks, the operator has to estimate the weight of the load goods to be lifted (lifting load) and the height to which the load goods are to be lifted (lifting height). On the basis of this, the driving speed and the turning radius of the industrial truck must be set such that there is no tipping of the industrial truck to the front or to the side. Although this demanding task must be managed in a static or quasi-static operating range, i.e., an operating range having a relatively low driving speed, it is easily possible for this to be too much for the operator. When the load-bearing capacity of the industrial truck is exceeded or in the event of driving maneuvers which are not adapted to the current lifting load and lifting height, there is the risk of tipping accidents involving severe injury or death to the operator or nearby people, associated with a high level of damage to property. There has, therefore, been no shortage of thought given to creating suitable safety precautions for preventing accidents involving industrial trucks.

DE 29 09 667 C3, for example, has described a generic industrial truck providing intervention in the traction drive depending on the steering angle, the lifting height, and the load torque, and, in the process, the driving speed and, if necessary, also the (electromotive) braking deceleration are limited. This takes place by overriding the desired values predetermined by the operator, using correction signals from the control device.

The subject matter of EP 0 343 839 B1 is an industrial truck in which the driving speed is limited depending on the lifting load, the lifting height, the steering angle, and the direction of travel or the position of the center of gravity of the vehicle. In addition, provision is also made for limiting the acceleration of the industrial truck depending on the lifting height.

EP 1 078 878 A1 discloses the concept of limiting the tilting speed of an industrial-truck lifting mast depending on the lifting load and the lifting height.

Finally, EP 1 019 315 B1 discloses an industrial truck in which the driving speed is limited depending on the lifting load and the tilting angle, and a higher lowering speed without a load is made possible.

The present invention is based on the object of providing an industrial truck of the general type mentioned above but having further improved tipping stability.

SUMMARY OF THE INVENTION

This object is achieved according to the invention by a calculation model, which is based on vehicle-specific information, for the static and/or quasi-static tipping behavior of the industrial truck being stored in a control device, to which directly or indirectly acting sensors are connected for the purpose of detecting the lifting load, the lifting height, the tilting angle, the load torque, the direction of travel, the driving speed, and the steering angle. The control device is designed to determine a driving and load state which is based on the detected physical variables and the stored calculation model and being operatively connected to the traction drive and the operating drives such that, depending on the driving and load state determined, the operating speed, starting and braking acceleration, and/or driving speed, which can be achieved or are achieved, are each controlled, e.g., reduced.

The concept of the invention accordingly includes intervening, with the help of logic, which is implemented by a control device and monitors static and/or quasi-static tipping risks (given a high lifting height and lifting load when at a standstill or at a low driving speed), in the vehicle behavior to such an extent that the vehicle is prevented from tipping over. In the process, the control device has the effect of a limitation of the actual values which can be achieved or, in an extreme case, the effect of reducing the actual values already achieved as regards the operating speed, the starting and braking acceleration, and/or the driving speed.

This can be achieved, for example, by reducing the desired values predetermined by the operator (overriding the desired values predetermined by the operator by corrections from the control device). This reduces the actual values ("which can be achieved") which correspond thereto during normal operation if control levers or other operating members are deflected in a certain way. In the individual case, this may mean, for example, that, when the industrial truck is at a standstill, the operator wishes to tilt the lifted load forward at a specific speed by actuating a control lever but the tilting speed is reduced to zero by the control device owing to an impermissibly high risk of tipping, i.e., the forward tilting movement is completely prevented. However, it is also possible to reduce already existing ("achieved") actual values by using the control device. Example: When an industrial truck is starting to reverse, the operator wishes to lift the load. The control device allows the lifting -operation (possibly at a reduced lifting speed) but reduces the starting acceleration and/or driving speed already achieved.

The operating speed of the load-lifting device is primarily understood to mean, in the context of the invention, the lifting and tilting speed. The lowering speed is also preferably included. Of course, further movements of the load-lifting device may also be taken into consideration, for example the movement of a side loader or a pivoting apparatus.

Some of the sensors provided for implementing the invention (for example the tilting angle sensor, the lifting height sensor) are frequently already provided in generic industrial trucks as standard or special equipment, with the result that the expenditure required for implementing the invention is relatively low. This also applies to the signal paths between the control device and the drive systems of the industrial truck.

The tilting angle sensor can, depending on the embodiment of the industrial truck, detect the tilting angle of the lifting mast or, given a fixed lifting mast, the tilting angle of the height-adjustable load carriage on the lifting mast. The steering speed can also be derived from the signal from the steering angle sensor.

The extensive sensor system, which is overall provided, makes possible detection from far more operating points than is the case with individual solutions, which are known from the current art.

With the industrial truck designed according to the invention, primarily tipping accidents are prevented which result from excessively large, rapid, or abrupt adjustment commands by the operator.

In accordance with one advantageous development of the invention, the priority is the reduction in the starting and braking acceleration and driving speed which can be achieved or are achieved. This is based on the consideration that, in the range of static and/or quasi-static tipping, it is mainly the operating drive of the load-lifting device which is used and it is, therefore, more favorable to influence the traction drive so as to increase the tipping stability.

The vehicle-specific information stored in the control device at least expediently comprises data on the dimensions and the weights of the industrial truck and the load-lifting device (lifting mast) and on the maximum load.

In a further refinement of the invention, the driving and load state is determined, using the vehicle-specific information available and the physical variables detected by the sensors, in the control device, at least the following driving maneuvers which are critical to tipping being monitored to ascertain whether interventions are required: braking whilst travelling forward with the vehicle being inclined forward, accelerating whilst reversing with the vehicle being inclined forward, braking out of reverse travel on a bend with the vehicle being inclined perpendicular to the tipping axis, and accelerating forward on a bend with the vehicle being inclined perpendicular to the tipping axis.

The term "vehicle being inclined" shall include a relatively small inclination of the vehicle with reference to the plane. A vehicle is inclined if the vehicle is located on a slope (gradient, e.g., less than 3%).

BRIEF DESCRIPTION OF THE DRAWINGS

Further advantages and details of the invention are explained in more detail with reference to the exemplary embodiment illustrated in the schematic figures, in which like reference numbers identify like parts throughout.

DESCRIPTION OF THE PREFERRED EMBODIMENT

Figure 1:
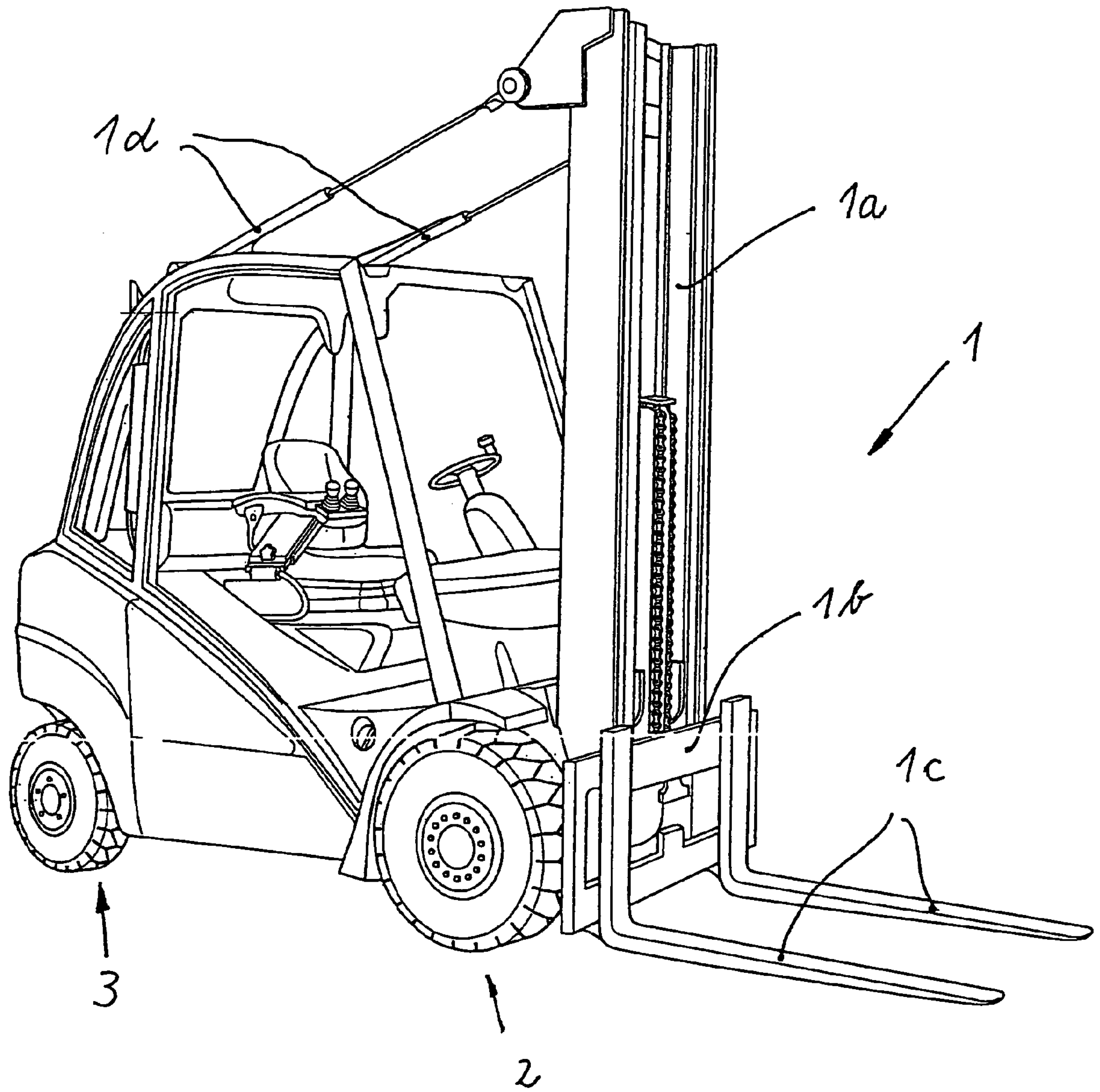
Fig. 1 Prior Art
FIG. 1 shows a perspective illustration of an industrial truck.

The industrial truck shown in FIG. 1 is in the form of a forward-control counterweight fork-lift truck. A load-lifting device 1 arranged on the vehicle front is formed by an extendable lifting mast 1*a* and a height-adjustable load carriage 1*b* on the lifting mast 1*a* having fork prongs 1*c* suspended in the load carriage 1*b*. With the aid of the fork prongs 1*c*, load goods of a variety of types can be lifted and transported.

The lifting mast la can be tilted about a horizontal axis arranged transversely in the lower region. Of course, it is also possible for a rigid, i.e., non-tiltable, lifting mast to be provided and, instead, the load carriage to be designed such that it is not only height-adjustable but is also tiltable, as is often the case, for example, with so-called warehousing devices (for example reach trucks). Other load-receiving devices may also be fixed to the load carriage 1*b*, depending on the intended use. It goes without saying that, in principle, additional movements of the load-lifting device are also possible as long as the devices required for this purpose, for example a side loader, are available.

The lifting mast 1*a* can be tilted by means of hydraulic tilting cylinders 1*d*. The lifting mast 1*a* is extended and the load carriage 1*b* lifted by means of hydraulic lifting cylinders, possibly additionally having one or more load chains. The dead weight of the load carriage 1*b* and the components of the lifting mast 1*a* which are extended upwards and, if necessary, the weight of the load goods serve to lower the load carriage 1*b* or to retract the lifting mast 1*a*. These hydraulic consumers are fed by a hydraulic pump. Together with the hydraulic valves required and a motor driving the pump, this system thus comprises a plurality of operating drives for the lifting, lowering, and tilting movement of the load-lifting device.

The fork-lift truck in accordance with the exemplary embodiment also has a traction drive, in which a front axle 2 is in the form of a drive axle, and a steering drive, with the aid of which a steering axle 3 arranged at the rear is actuated.

Figure 2:
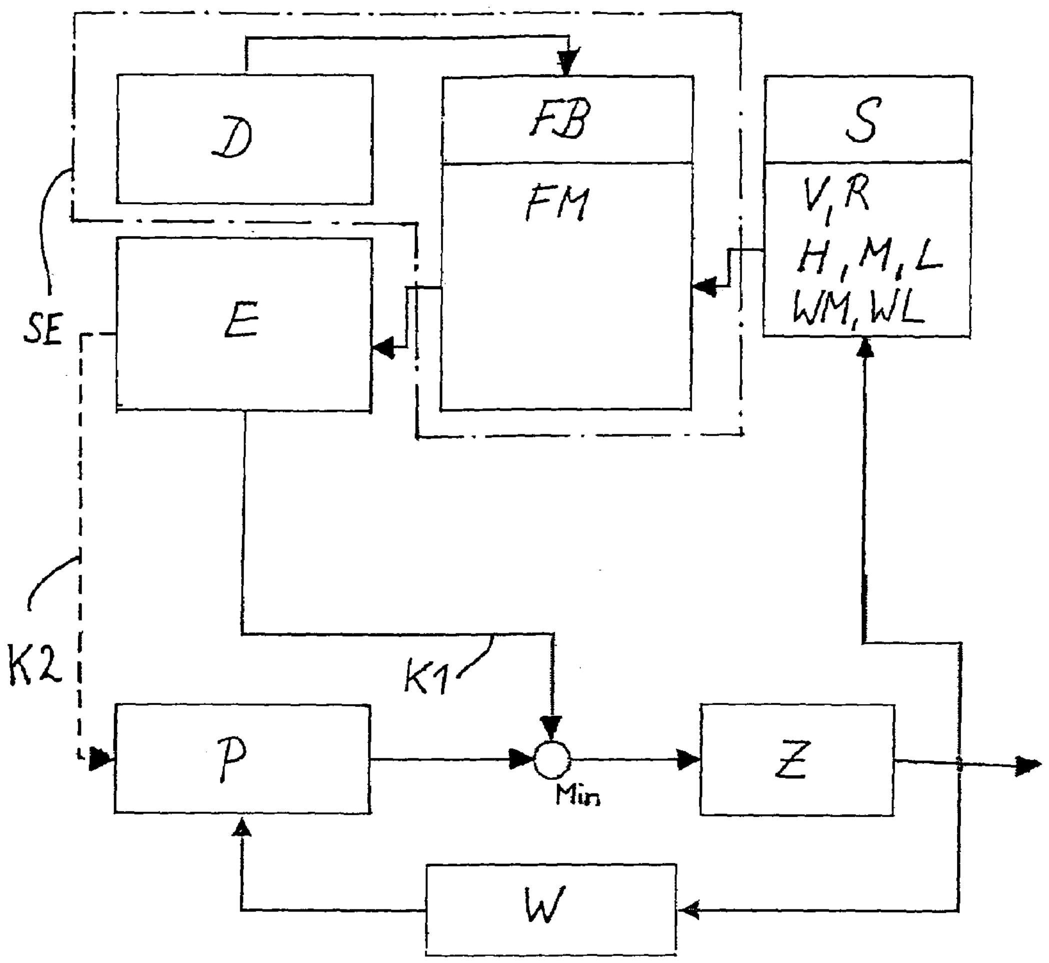
FIG. 2 shows a control structure incorporating features of the invention.

FIG. 2 shows the control structure of the industrial truck according to the invention. A driving and load state Z results from the inputs P, originating from the operator, to the driving pedals, the steering wheel, and the operating levers. This driving and load state Z is fed back to the operator in the form of a subjective observation W, on the basis of which the inputs P are altered, if necessary.

The fork-lift truck is equipped with sensors S, with the aid of which physical variables can be detected from which the driving and load state Z can be determined objectively with respect to static and quasi-static tipping risks. These variables can include the lifting load L, the lifting height H, the load torque M, the mast tilting angle WM, the steering angle WL applied to the steering axle, the direction of travel R, and the driving speed V. For example, the tilting cylinder forces or the axle load on the steering axle 3 can be used to determine the load torque M. The lifting load L can be determined from the lifting cylinder forces.

The measured values detected by the sensors S are passed on to a control device SE in which, on the basis of vehicle-specific data, such as the dimensions and weights of the industrial truck and of the lifting mast and the maximum possible load, a calculation model D for the fork-lift truck is stored.

In the control device SE, the current driving and load state Z of the industrial truck is determined in a driving-state observer FB from the calculation model D and the measured values from the sensors S, and, in the process, it is established whether the operating and/or driving movements are critical to tipping and therefore make interventions necessary.

In this case, critical driving maneuvers FM are monitored by the driving-state observer FB, in particular the following driving maneuvers: braking whilst travelling forward with the vehicle being inclined forward, accelerating whilst reversing with the vehicle being inclined forward, braking out of reverse travel on a bend with the vehicle being inclined perpendicular to the tipping axis, and accelerating forward on a bend with the vehicle being inclined perpendicular to the tipping axis.

From this it is possible to derive the interventions E in the traction drive and the operating drive which may be necessary and which lead to the tipping limits not being reached or being exceeded. The control device SE thus has the effect of increasing the tipping stability.

The interventions carried out are interventions (for example, reduction of the driving and operating speed), with which, in each case, one or more of the inputs P by the operator are corrected (connection K1), for example by overriding the desired values. They may also be interventions, by means of which the inputs P are influenced at the time they are produced (arrow K2), for example an increased operating resistance.

Figure 3:
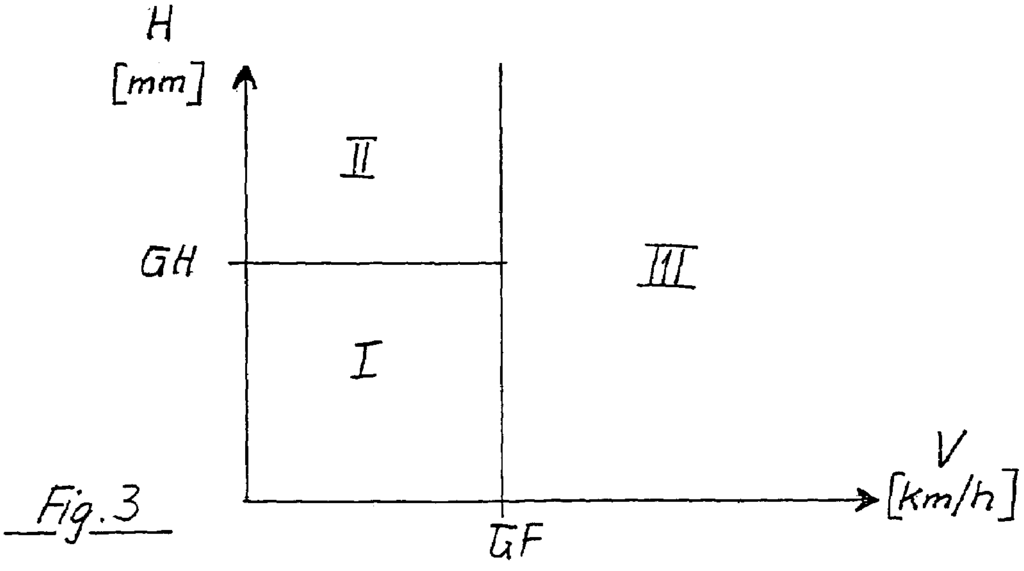
FIG. 3 shows a state diagram.

The state diagram illustrated in FIG. 3, in which the driving speed is plotted in km/h on the horizontal axis and the lifting height is plotted in mm on the vertical axis, shows three operating ranges I, II, and III. In this case, a first operating range I starting from the coordinate origin is defined by a limiting lifting height GH (which is, for example, in a range from 300 to 600 mm) and a limiting driving speed GF (which is, for example, in a range from 1 to 4 km/h). Whilst maintaining the limiting driving speed GF, adjoining at the top is an operating range II, in which the lifting height is greater than the limiting lifting height GH. To the right of operating ranges I and II, i.e., when the limiting driving speed GF is exceeded, there is a third operating range III which is not considered here.

Operating range I represents that static or quasi-static range in which the risk of tipping accidents is at its lowest. It is, therefore, not necessary in operating range I for the control device to intervene so as to increase the tipping stability.

In operating range II, i.e., the range having the high lifting height but, as previously, low driving speed or at a standstill, there is the risk of static or quasi-static tipping, depending, inter alia, on the lifting load and the load torque. In this operating range II, the control device therefore has an effect which, depending on the driving and load state determined, reduces the operating speed of the load-lifting device, starting and braking acceleration, and driving speed of the industrial truck, which can be achieved or are achieved. In the process, excessively large, rapid, or abrupt adjustment commands by the operator are overridden and, as a result, the tipping stability is increased.

In this case, the degree and the extent of the intervention may depend on whether only driving maneuvers when travelling straight ahead are present, i.e., no or only a small steering angle (or no or only a low steering speed) is detected, or quasi-static cornering is present in the case of which, for example, a steering angle of more than 5 degrees is detected or the steering speed exceeds a determined value.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck having improved static or quasi-static tipping stability, comprising:

a liftable and tiltable load-lifting device;

a traction drive and operating drives for movement of the load-lifting device;

a control device designed to store a calculation model, which is based on vehicle-specific information, for static and/or quasi-static tipping behavior of the industrial truck; and directly or indirectly acting sensors connected to the control device for detecting physical variables including a lifting load, a lifting height, a tilting angle, a load torque, a direction of travel of the industrial truck, a driving speed of the industrial truck, and a steering angle, wherein the control device includes a driving-state observer designed to determine a driving and load state based on the detected physical variables and the stored calculation model and operatively connected to the traction drive and the operating drives such that, depending on the driving and load state determined, one or more of the operating speed of the load lifting device or starting and braking acceleration of the industrial truck which can be achieved or are achieved, are reduced, wherein said industrial truck is a forward control counterweight fork-lift truck, wherein the control device is designed to give in a state diagram for the driving speed of the fork-lift truck and the lifting height of the load lifting device a first operating range and a second operating range and the first operating range is defined by a limiting lifting height of the load lifting device and a limiting driving speed of the fork-lift truck and represents the static or quasi-static range in which the risk of tipping accidents of the fork-lift truck is at its lowest and the second operating range is defined by the limiting driving speed of the fork-lift truck and a lifting height of the load lifting device greater than the limiting lifting height of the first operating range and represents the static or quasi-static range in which the risk of tipping accidents of the fork-lift truck is greater than that of the first operating range, wherein the control device is further designed to intervene when said driving and load state is determined to be in said second operating range to increase the tipping stability of the fork-lift truck by reducing one or more of the operating speed of the load-lifting device or the starting and braking acceleration of the fork-lift truck, and wherein the control device is further designed to reduce the starting and braking acceleration of the fork-lift truck which can be achieved or are achieved while allowing the lifting operation of the load-lifting device when the driving and load state is determined to be in at least the second operating range in order to increase the tipping stability of the fork-lift truck.

2. The industrial truck according to claim 1, wherein vehicle-specific information contained in the control device at least comprises data on the dimensions and the weights of the fork-lift truck and the load-lifting device and on the load.

3. The industrial truck according to claim 1, wherein the control device is designed to monitor at least the following driving maneuvers which are critical to tipping: braking whilst traveling forward with the vehicle being inclined forward, accelerating whilst reversing with the vehicle being inclined forward, braking out of reverse travel on a bend with the vehicle being inclined perpendicular to the tipping axis, and accelerating forward on a bend with the vehicle being inclined perpendicular to the tipping axis.

4. The industrial truck according to claim 2, wherein the control device is designed to monitor at least the following driving maneuvers which are critical to tipping: braking whilst traveling forward with the vehicle being inclined forward, accelerating whilst reversing with the vehicle being inclined forward, braking out of reverse travel on a bend with the vehicle being inclined perpendicular to the tipping axis, and accelerating.

* * * * *